(No Model.)

S. BUNTING.
PNEUMATIC TIRE.

No. 596,980. Patented Jan. 11, 1898.

WITNESSES.
Alfred H. Croad.
William H. James

INVENTOR.
Stuart Bunting.
per. Robert E. Phillips
Attorney.

UNITED STATES PATENT OFFICE.

STUART BUNTING, OF BIRMINGHAM, ENGLAND.

PNEUMATIC TIRE.

SPECIFICATION forming part of Letters Patent No. 596,980, dated January 11, 1898.

Application filed July 31, 1897. Serial No. 646,585. (No model.) Patented in England June 20, 1896, No. 13,616.

*To all whom it may concern:*

Be it known that I, STUART BUNTING, manufacturer, a citizen of the United Kingdom of Great Britain and Ireland, residing at Birmingham, in the county of Warwick, England, have invented certain new and useful Improvements in Pneumatic Tires, (for which I have obtained a patent in Great Britain, No. 13,616, bearing date the 20th of June, 1896,) of which the following is a full and complete specification.

This invention relates to an improved construction of that type of pneumatic tire consisting of a single tube divided circumferentially and adapted when mounted in the wheel-rim to hold air under pressure without the use of a separate or independent air-tube.

Figure 1:
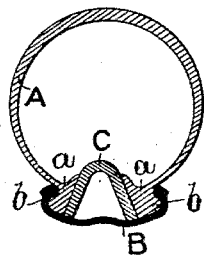
Figure 2:
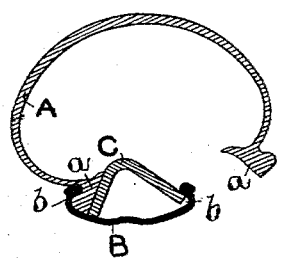
Figure 3:
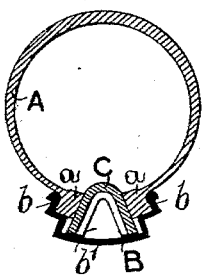
Figure 4:
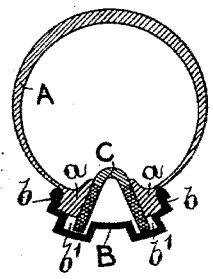
Figure 5:
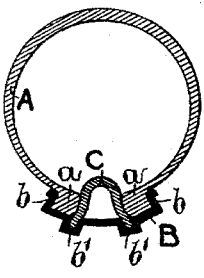
Figure 6:
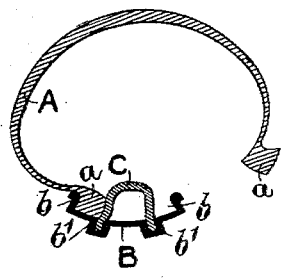

In the accompanying drawings, which illustrate this invention, Figure 1 is a view in transverse section, showing the tire mounted in the wheel-rim in a manner in use prior to this invention. Fig. 2 is a similar view showing one edge of the tire dismounted from the wheel-rim. Figs. 3 and 4 are views in transverse section of two forms my invention may assume; and Figs. 5 and 6 are views in transverse section of a modification, the former showing the tire mounted in the wheel-rim and the latter showing one edge of the tire dismounted.

Throughout the views similar parts are marked with like letters of reference.

The tire A, which is made of rubber, reinforced with canvas or other suitable fabric and lined with rubber or other suitable air-proof material, is divided circumferentially on its inner side and has beads or enlargements $a$ on its edges, which are shaped to adapt them to engage with recesses $b$ at the edges of the wheel-rim B. Between the enlarged edges $a$ of the tire is a hoop or band C, of an inverted V or U shape in cross-section, the said band being so shaped and formed that it exerts a transverse pressure on the edges $a$ of the tire A when placed in the wheel-rim, and therefore acts both to keep said edges engaged with the recesses $b$ in the wheel-rim and to make an air-tight joint between the said edges.

The hoop or band C may either be made in the form of an endless flat strip or it may be molded in an arched shape. The latter construction is the most convenient when it is necessary to vary the thickness of the crown of the arch for the purpose of enabling it to exert greater transverse pressure. Tires have been made in this way prior to the present invention.

In carrying out the present invention the hoop or band C may either be made of soft rubber or it may be made partly of hard rubber and partly of soft rubber, the edges being made of hard rubber and the center part of soft rubber, as shown by Fig. 4, in which case the elasticity of the hoop or band is confined to the crown of the arch. The hoop or band can be stiffened without unduly increasing the weight by making it corrugated or ribbed on its inner side, as shown in Fig. 3.

The hoop or band C is preferably fixed to one of the edges $a$ of the tire, but this is not obligatory.

In order to retain the hoop or band C in the wheel-rim and keep it in a central position when the tire is removed, the wheel-rim B may have either one circumferential recess $b'$ in the bottom of its groove, as shown by Fig. 3, or two such recesses $b'$ $b'$, as shown by Fig. 4, for the feet of the hoop or band C to rest in.

As a modification the edges of the hoop or band C may fit tightly in the grooves $b'$ $b'$ in the wheel-rim, as shown by Figs. 5 and 6, whereby the transverse elasticity of the hoop or band is enhanced without increasing its size or thickness.

It will be seen that by this construction an initial air-tight joint is obtained before inflation is commenced by the use of the transversely-elastic hoop or band C and that the pressure of the said hoop or band on the edges of the tire is reinforced when the tire is inflated, owing to the crushing pressure exerted on it by the compressed air.

What I claim as my invention, and desire to secure by Letters Patent, is—

1. The combination, with a wheel-rim having circumferential recesses, of a divided tire provided with enlargements at its edges which engage with the said recesses, and an arch-shaped locking-band arranged between the said enlargements, the crown of the said band being of soft rubber and its sides of hard rubber, substantially as set forth.

2. The combination, with a wheel-rim having circumferential recesses, of a divided tire provided with enlargements at its edges which engage with the said recesses, and an arch-shaped locking-band arranged between the said enlargements, the said rim having also means, such as a circumferential groove or grooves, for engaging the feet of the said band and holding it centrally in position when the tire is removed from the rim, substantially as set forth.

3. The combination, with a wheel-rim having circumferential recesses and circumferential grooves between and below the said recesses, of a divided tire provided with enlargements at its edges which engage with the said recesses, and an arch-shaped locking-band arranged between the said enlargements with its feet secured tightly in the said grooves, substantially as set forth.

STUART BUNTING.

Witnesses:
JOHN HENRY FROST,
WALTER HOLLEN JONES.